Patented Mar. 6, 1934

1,949,412

UNITED STATES PATENT OFFICE 1,949,412

PROCESS FOR THE MANUFACTURE OF ALIPHATIC KETONES

Henry Dreyfus, London, England

No Drawing. Application July 29, 1930, Serial No. 471,598. In Great Britain August 19, 1929

8 Claims. (Cl. 260—134)

This invention relates to the manufacture of ketones and especially to the manufacture of acetone.

According to the present invention I produce aliphatic ketones (and especially acetone) by subjecting the vapors of primary aliphatic alcohols containing at least two carbon atoms or their aldehydes or organic acid esters thereof (and especially vapors of ethyl alcohol acetaldehyde or ethyl acetate) in admixture with steam and/or vapor of one or more aliphatic acids (e. g. acetic acid vapor), to the action of high temperatures in presence of a catalyst consisting of one or more oxides, hydroxides, carbonates or other compounds—particularly weak acid salts such for instance as borates, phosphates, or silicates—of the earth alkali metals.

The primary alcohols, aldehydes and the organic acid esters of the alcohols are all hereinafter included in the term $C_nH_{2n+1}R$, where R is a primary alcohol group $CH_2OH$ or an aldehyde group or an organically esterified carboxylic acid group.

As examples of the catalysts may be mentioned the following:—the oxides, hydroxides, carbonates, meta borates, normal, meta and pyrophosphates and silicates of calcium, barium and magnesium, and mixtures of two or more of such bodies.

The catalysts may, if desired, be employed spread upon, or deposited upon filling or contact materials such for instance as kieselguhr or the like.

The reaction of the invention may be performed at temperatures between about 200° and 700° C., and especially at temperatures between about 350° and 550° C.

The mixture of the alcohol vapor (or of the aldehyde or ester thereof) with the steam and/or vapors of the aliphatic acid or acids may be submitted to the reaction in any convenient way. As for instance the mixture may be passed in a rapid stream through a tube or other form of apparatus (e. g. a tube or apparatus of copper, iron, "Staybrite", earthenware, or the like) filled or provided with the catalyst and heated to the desired temperature.

The process of the invention may be performed under any desired pressure as for instance under normal atmospheric pressure or under reduced pressure or "vacuum" or under higher pressures such for example as from 2 to 10 or more atmospheres.

For the purposes of the invention I preferably employ mixtures of alcohol vapor (or aldehydes or esters thereof) and steam and/or aliphatic acid vapor containing relatively large proportions of the steam and/or aliphatic acid vapor relatively to the alcohol (or aldehydes or ester) vapor, for instance mixtures containing more than two molecules of steam or aliphatic acid (or like quantity of steam and aliphatic acid) relatively to each molecule of alcohol or aldehyde or ester or, for instance, mixtures containing large quantities of steam and/or aliphatic acid vapor, such for instance as mixtures containing from 5 to 20 or more volumes of steam and/or aliphatic acid vapor for each volume of the alcohol aldehyde or ester derivative.

In cases where both steam and aliphatic acid vapor are employed, the steam may be present in any desired proportion relatively to the aliphatic acid or acids. Thus for instance the alcohol or aldehyde or ester vapor may be caused to react in the desired proportion with a mixture containing between 10 and 90% of steam and between 90 and 10% of acetic acid or other aliphatic acid vapor.

The following example serves to illustrate a convenient form of execution of the invention, but it is to be understood that it is in no way limitative:—

Example

A mixture of ethyl alcohol vapor, steam and acetic acid vapor, in about the proportions 1:3:3 by volume is passed through a tube (e. g. of copper) or other form of apparatus filled or provided with the catalyst, composed of calcium oxide, or calcium silicate and maintained at a temperature of about 420–470° C. There results a copious yield of acetone, which may be purified, if desired, by fractional distillation.

What I claim and desire to secure by Letters Patent is:—

1. Process for the manufacture of an aliphatic ketone, which comprises subjecting the vapor of a body of formula $C_nH_{2n+1}R$, where R is a primary alcohol group $CH_2OH$ or an aldehyde group or an organically esterified carboxylic acid group, in admixture with steam to the action of temperatures between 200 and 700° C. in presence of a catalyst composed of calcium silicate.

2. Process for the manufacture of an aliphatic ketone, which comprises subjecting the vapor of a body of formula $C_nH_{2n+1}R$, where R is a primary alcohol group $CH_2OH$ or an aldehyde group or an organically esterified carboxylic acid group in admixture with steam to a temperature between 350° and 550° C. in presence of a catalyst composed of calcium silicate.

3. Process for the manufacture of acetone, which comprises subjecting the vapor of ethyl alcohol in admixture with steam to a temperature between 350° and 550° C. in presence of a catalyst composed of calcium silicate.

4. Process for the manufacture of acetone, which comprises subjecting acetaldehyde in admixture with steam to a temperature between 200° and 700° C. in presence of a catalyst composed of calcium silicate.

5. Process for the manufacture of acetone, which comprises subjecting a mixture of between 5 and 20 volumes of steam and 1 volume of alcohol vapor to a temperature between 350° and 550° C. in presence of a catalyst composed of calcium silicate.

6. Process for the manufacture of acetone, which comprises subjecting a mixture of between 5 and 20 volumes of steam and 1 volume of acetaldehyde vapor to a temperature between 350° and 550° C. in presence of a catalyst composed of calcium silicate.

7. Process for the manufacture of an aliphatic ketone, which comprises subjecting the vapor of a body of formula $C_nH_{2n+1}R$, where R is a primary alcohol group $CH_2OH$ or an aldehyde group or an organically esterified carboxylic acid group, in admixture with steam to the action of temperatures between 200 and 700° C. in presence of a catalyst composed of an alkaline earth salt of a weak acid selected from the group consisting of borates, phosphates and silicates.

8. Process for the manufacture of an aliphatic ketone, which comprises subjecting the vapor of a body of formula $C_nH_{2n+1}R$, where R is a primary alcohol group $CH_2OH$ or an aldehyde group or an organically esterified carboxylic acid group, in admixture with steam to the action of temperatures between 200 and 700° C. in the presence of a catalyst composed of a calcium salt of a weak acid selected from the group consisting of borates, phosphates and silicates.

HENRY DREYFUS.

CERTIFICATE OF CORRECTION.

Patent No. 1,949,412.  March 6, 1934.

HENRY DREYFUS.

It is hereby certified that error appears in the printed specification of the above numbered patent requiring correction as follows: Page 1, lines 68 and 69, for "alcohol aldehyde or ester derivative" read alcohol or aldehyde or ester; and that the said Letters Patent should be read with this correction therein that the same may conform to the record of the case in the Patent Office.

Signed and sealed this 24th day of April, A. D. 1934.

Bryan M. Battey (Seal)  Acting Commissioner of Patents.